United States Patent
Wolfe, II et al.

(10) Patent No.: US 10,729,109 B1
(45) Date of Patent: Aug. 4, 2020

(54) TWO QUEEN BEE HIVE

(71) Applicants: Nathaniel W. Wolfe, II, Townsend, DE (US); George A. Datto, III, Glen Mills, PA (US)

(72) Inventors: Nathaniel W. Wolfe, II, Townsend, DE (US); George A. Datto, III, Glen Mills, PA (US)

( * ) Notice: Subject to any disclaimer, the term of this patent is extended or adjusted under 35 U.S.C. 154(b) by 60 days.

(21) Appl. No.: 15/904,460

(22) Filed: Feb. 26, 2018

(51) Int. Cl.
  *A01K 47/06* (2006.01)
  *A01K 47/02* (2006.01)

(52) U.S. Cl.
  CPC .............. *A01K 47/06* (2013.01); *A01K 47/02* (2013.01)

(58) Field of Classification Search
  CPC ........ A01K 47/00; A01K 47/02; A01K 47/06; A01K 49/00
  See application file for complete search history.

(56) References Cited

U.S. PATENT DOCUMENTS

| | | | | |
|---|---|---|---|---|
| 2,151 A | * | 7/1841 | Weeks | A01K 47/06 449/13 |
| 9,300 A | * | 10/1852 | Langstroth | A01K 47/06 449/14 |
| 91,203 A | * | 6/1869 | Berix | A01K 47/06 449/22 |
| 330,783 A | * | 11/1885 | Groff | A01K 47/00 449/38 |
| 1,417,623 A | | 5/1922 | Kelley | |
| 1,470,112 A | * | 10/1923 | Cottam | A01K 47/06 449/16 |
| 2,128,000 A | | 8/1938 | King | |
| 2,543,750 A | * | 3/1951 | Albrecht | A01K 47/00 449/7 |
| 4,135,265 A | | 1/1979 | Van de Kerkof | |
| 4,546,509 A | | 10/1985 | Huetter | |

(Continued)

FOREIGN PATENT DOCUMENTS

| CH | 93505 A | * | 3/1922 | ............. A01K 47/00 |
|---|---|---|---|---|
| FR | 2595909 A1 | * | 9/1987 | ............. A01K 47/00 |

(Continued)

OTHER PUBLICATIONS

"Two queens, one hive=lots of honey", https://honeybeesuite.com/two-queens-one-hivelots-of-honey/. Printed Oct. 27, 2017.

*Primary Examiner* — Magdalena Topolski
*Assistant Examiner* — Morgan T Barlow
(74) *Attorney, Agent, or Firm* — Joseph E. Maenner; Petock & Petock LLC

(57) ABSTRACT

A two queen beehive includes a base having a first compartment for retaining a first queen, a second compartment for retaining a second queen, and a divider dividing the first compartment from the second compartment. A first roof extends over a portion of the first compartment, such that a remaining portion of the first compartment proximate to the divider is open. A second roof extends over a portion of the second compartment, such that a remaining portion of the second compartment proximate to the divider is open. A distance encompassing the remaining portion of the first compartment, the divider, and the remaining portion of the second compartment is sized to receive and retain a super mounted thereon.

19 Claims, 8 Drawing Sheets

(56) References Cited

U.S. PATENT DOCUMENTS

| | | | | |
|---|---|---|---|---|
| 4,983,139 A | * | 1/1991 | Kretschmann | A01K 47/00 449/15 |
| 2010/0105282 A1 | * | 4/2010 | Alazemi | A01K 47/00 449/26 |
| 2016/0353714 A1 | | 12/2016 | Manzer et al. | |

FOREIGN PATENT DOCUMENTS

| | | | | | |
|---|---|---|---|---|---|
| GB | 543588 A | * | 3/1942 | | A01K 47/00 |
| WO | WO2015/109415 | | 7/2015 | | |

* cited by examiner

TWO QUEEN BEE HIVE

BACKGROUND OF THE INVENTION

Field of the Invention

The present invention relates to a bee hive in which two queens can co-exist without the queens interacting, resulting in one queen killing the other queen.

Description of the Related Art

Two queen bee hives are known and provide more honey than two single queen bee hives combined. The difficulty in providing and managing a two queen hive is keeping the queens separated from each other so that one queen does not kill the other queen, thus reducing the productivity of the hive.

Known two-queen bee hives, however, have significant drawbacks in demaree manipulation, which traditionally requires a bee keeper to remove all of the honey supers to manage the brood nest, which sits below a queen excluder.

It would be beneficial to provide a two queen bee hive in which the honey supers do not have to be removed to access the queen and manage the brood nest.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a two queen beehive including a base having a first compartment for retaining a first queen, a second compartment for retaining a second queen, and a divider dividing the first compartment from the second compartment. A first roof extends over a portion of the first compartment, such that a remaining portion of the first compartment proximate to the divider is open. A second roof extends over a portion of the second compartment, such that a remaining portion of the second compartment proximate to the divider is open. A distance encompassing the remaining portion of the first compartment, the divider, and the remaining portion of the second compartment is sized to receive and retain a super mounted thereon.

In an alternative embodiment, the present invention provides a two queen beehive including a base having a first end portion sized to retain a plurality of frames inserted therein, a second end portion sized to retain a like plurality of frames inserted therein, and a divider extending between the first end portion and the second end portion. A first roof removably extends over the first portion. A second roof removably extends over the second portion. An area is provided between the first roof and the second roof such that a super is adapted to fit within the area.

In still another alternative embodiment, the present invention provides a two queen beehive including a base portion comprising a first queen compartment, a second queen compartment and a dividing compartment located between the first queen compartment and the second queen compartment. A first generally U-shaped roof is removably inserted over the first queen compartment, such that the first generally U-shaped roof provides a first opening in the first compartment. A second generally U-shaped compartment is removably inserted over the second queen compartment, such that the second generally U-shaped roof provides a second opening in the second compartment. The first opening, the dividing compartment, and the second opening are sized such that a super is removably insertable over the first opening and the second opening.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
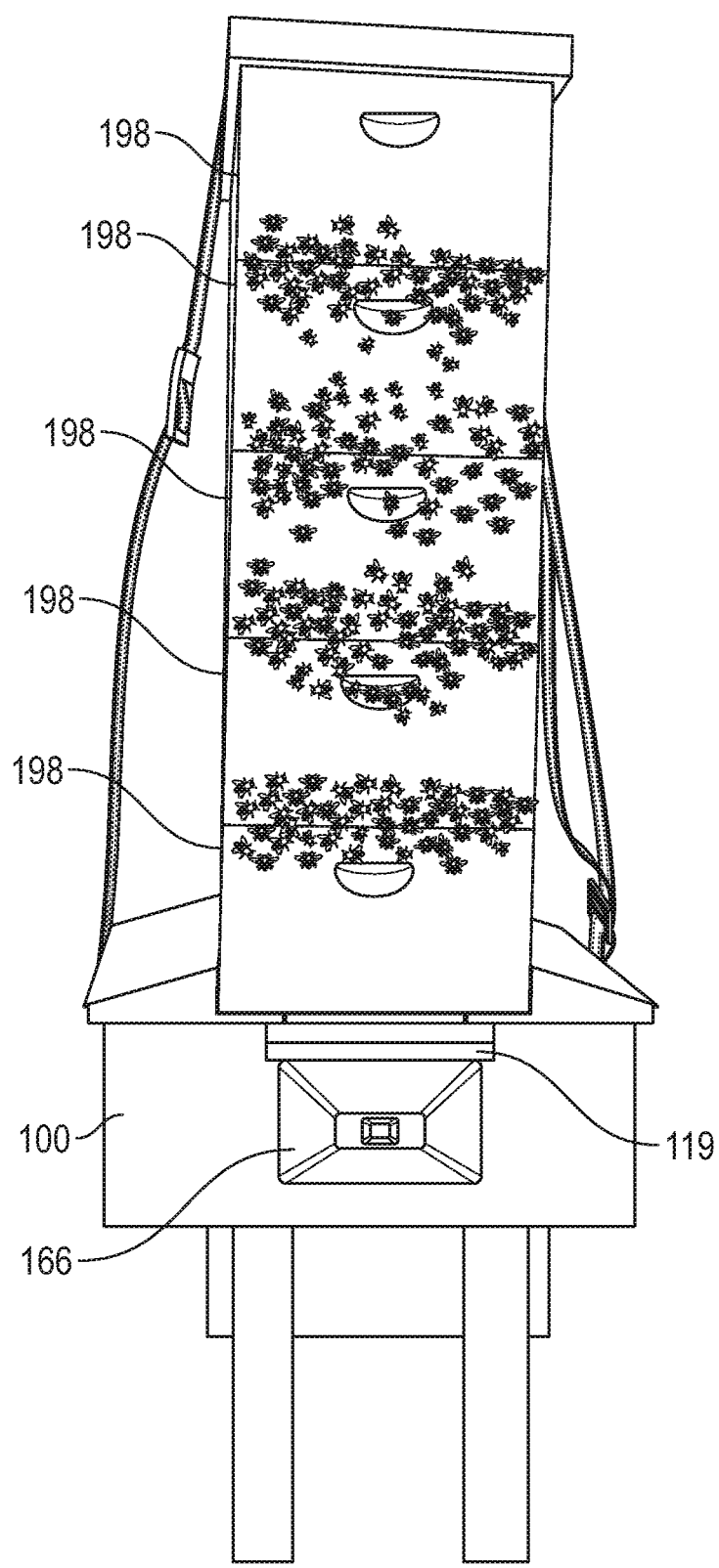
FIG. 1 is a side elevational view of a two queen beehive according to an exemplary embodiment of the present invention, with five supers stacked on top of the beehive.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to FIGS. 1-9A, a two queen beehive 100 according to an exemplary embodiment of the present invention is used to quickly and easily locate and to manage a brood nest without requiring a beekeeper to lift and remove honey supers from the top of the beehive 100. Additionally, moving frames from the queen compartments to above the queen excluder can be accomplished without disassembling the entire beehive 100, thereby saving time and reducing the potential for back strain and injury to beekeepers.

With the beehive 100, a beekeeper can maintain a two queen hive that facilitates easy demaree manipulation to minimize swarming and to maximize honey production. Working beehive 100 can take as little as five minutes instead of a typical 30 minutes to manage a prior art two queen beehive. Additionally, total bee count can exceed 100,000 bees in beehive 100 instead of only 40,000 bees in a single queen beehive. Additionally, when used in the Mid-Atlantic region of the United States, beehive 100 can produce about 150 lbs of honey per year, as compared to only about 60 lbs of honey from two single queen beehives.

Figure 1A:
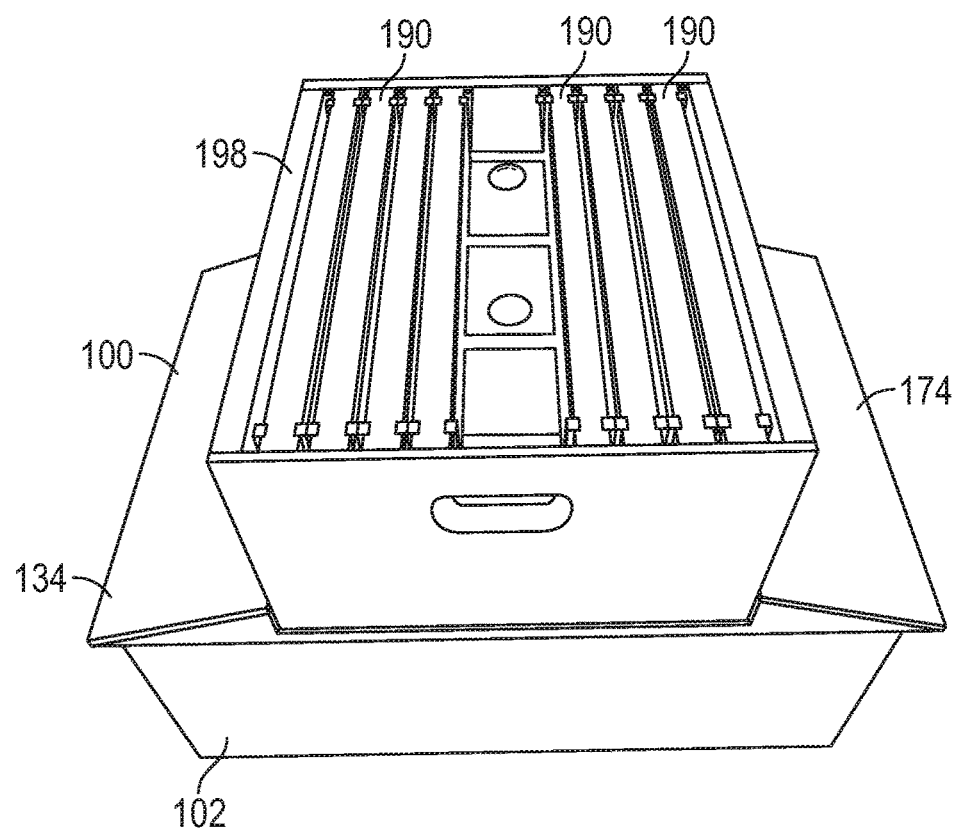
FIG. 1A is a perspective view of the beehive of FIG. 1, with the top four supers removed.

The inventive beehive 100 can incorporate commercially available artificial beehive components, as, for example, standard (or "deep") size frames 190, a queen excluder 180, and ten-frame supers 198. As shown in FIG. 1, about five supers 198 can be stacked on top of beehive 100. FIG. 1A shows a single super 198 on top of beehive 100, with the cover of super 198 having been removed.

Beehive 100 includes a generally parallelepiped base portion 102 having a first end portion that contains a first compartment 110 for retaining a first queen, a second end portion that contains a second compartment 140 for retaining a second queen, and a divider 160 that divides the first compartment 110 from the second compartment 140. Base portion 102 is sized such that, when the frames 190 are installed in the respective compartments 110, 140, a "bee space" exists between the sides and bottom of the frame 190 and the base portion 102. The bee space is typically between about 5/16" and about 3/8" all around, which is small enough to allow the bees in the beehive 100 to maneuver around the frame 190, yet sufficiently large so as not to encourage the bees to propylize in the space, which would effectively glue the frame 190 to the base portion 102, as well as prevent the bees from moving between frames 190 inside the compartments 110, 140.

In an exemplary embodiment, the first compartment 110 is identical to the second compartment 140, although that is not a necessity for the invention. For embodiments of the invention where the first compartment 110 and the second compartment 140 are identical, the below description of the first compartment 110 is also applicable to the second compartment 140.

The first compartment 110 has an open top 112, sides 114, 116, 118, 120, and a bottom 122. Optionally, an exterior of opposing sides, such as sides 114, 116 or sides 118, 120, can include a handle 119, shown in FIG. 1. Bottom 122 (shown in FIG. 2) has a plurality of ventilation openings 124 cut therein and mesh screening 126 across each opening 124. In an exemplary embodiment, five openings 124 are provided, having diameters of about three inches each.

Figure 3:
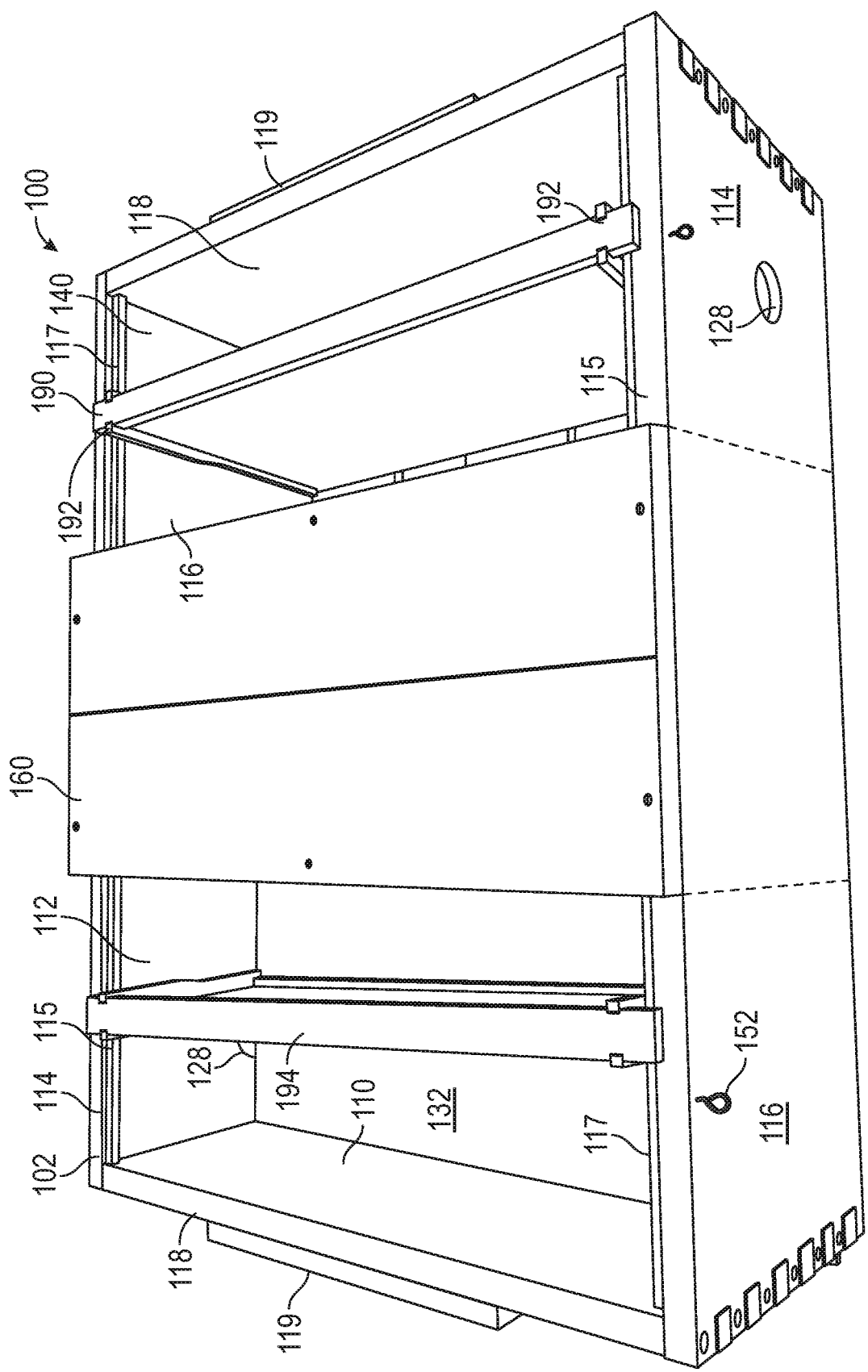
FIG. 3 is a side perspective view of the beehive of FIG. 1, with the supers, the queen excluder, and the queen compartment roofs removed.

Referring to FIG. 3, sides 114, 116 each include a side rail 115, 117 extending along a length thereof. The side rails 115, 117 extend into the queen compartments 110, 140 and serve to center the frames 190 within the respective compartments 110, 140 and discourage propylization between the frames 190 and the interior of sides 114, 116. Side 114 also has an opening 128 formed therein so that bees can enter and exit the first compartment 110. In an exemplary embodiment, opening 128 is about 1½ inches in diameter and the center of opening 128 is located about 4½ inches from the end of the first compartment 110 and about 4½" above the bottom of the first compartment 110.

Figure 4:
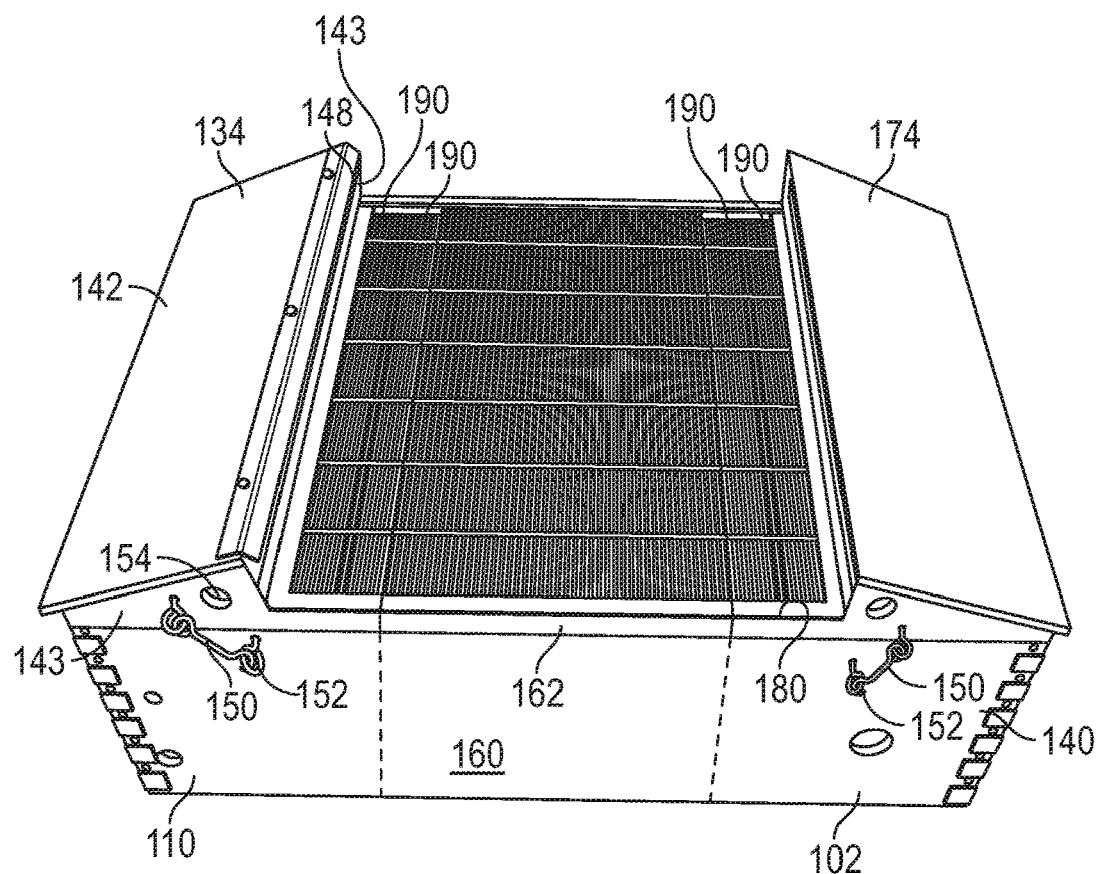
FIG. 4 is a perspective view of the beehive of FIG. 1A, with the fifth super removed.
Figure 4A:
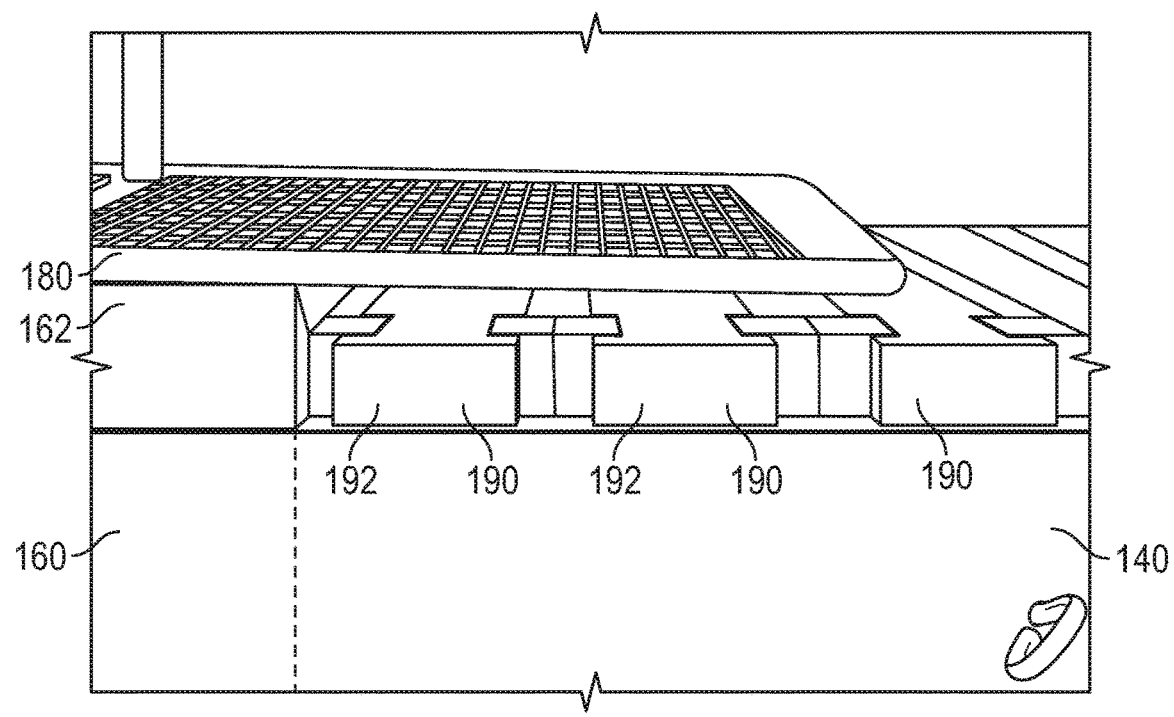
FIG. 4A is an enlarged elevational view of the queen excluder overhanging a portion of the first queen compartment.
Figure 4B:
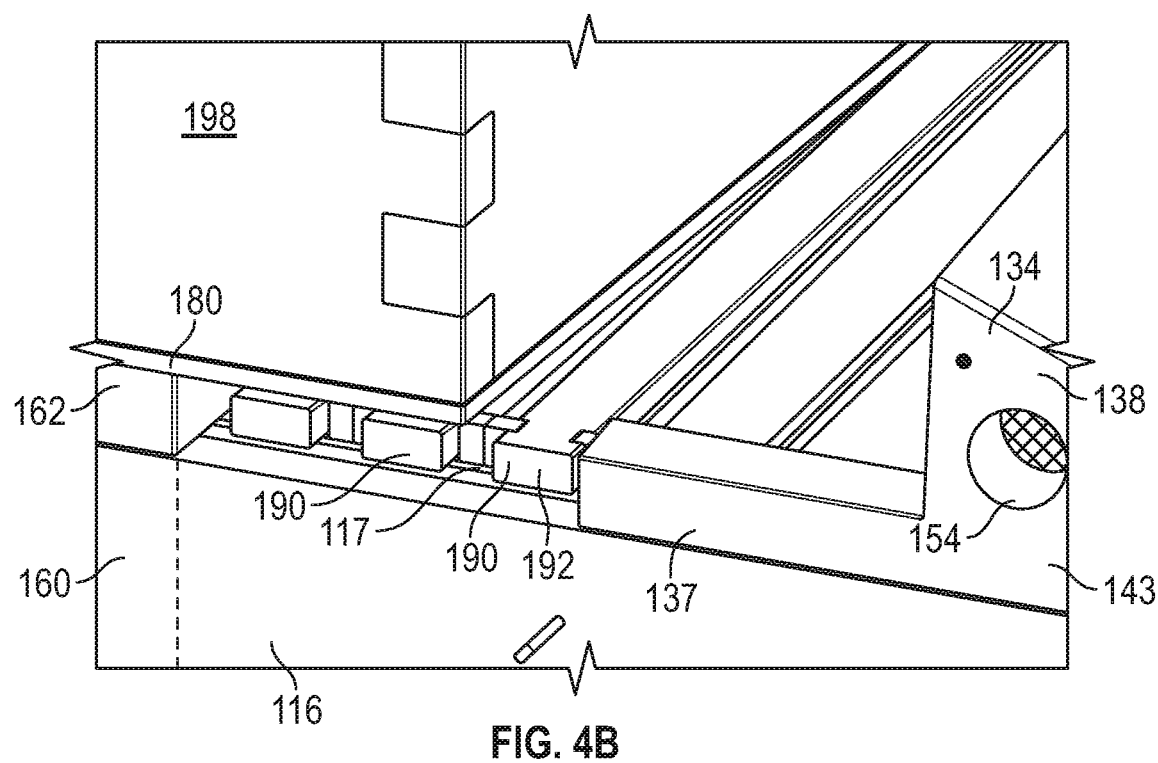
FIG. 4B is an enlarged perspective view of the beehive of FIG. 1, with a queen compartment roof slid away from the super.

Referring to FIG. 4, the first compartment 110 is sized to be able to removably receive a plurality of frames 190, which are commercially available honeycombed structures in which the queen lays her eggs. In an exemplary embodiment, first compartment 110 is about 9¼ inches long, about 20 inches wide, and about 9¼ inches high, although those skilled in the art will recognize that the first compartment 110 can have other dimensions. Referring to FIGS. 4A and 4B, each frame 190 includes an end tang 192 that extends over the side rails 115, 117 so that the side rails 115, 117 vertically support each frame 190. Each frame 190 is about 20 inches long and about 9 inches high, such that the bottom of the frame 90 is slightly elevated above the bottom 122 of the first compartment 110. In an exemplary embodiment, six frames 190 can fit into the first compartment 110.

Figure 2:
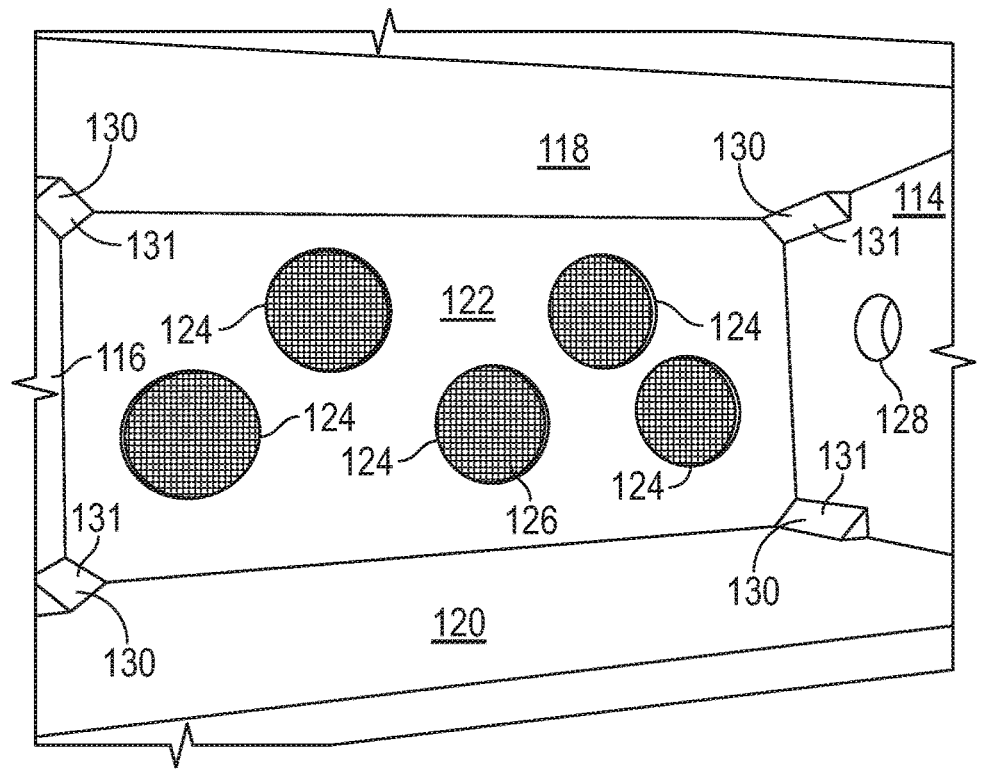
FIG. 2 is a perspective view of the first compartment of the beehive of FIG. 1.

Referring back to FIG. 2, the first compartment 110 includes a ledge 130 that extends at least partially around an inner perimeter of the first compartment 110. The ledge 130 is adapted to removably receive a platform 132 (shown in FIG. 5). As shown in FIG. 2, the ledge 130 comprises four corner pieces 131, each located in a corner of the first compartment 110. The platform 132 is removably laid on top of the ledge 130, reducing the available height of the first compartment 110. Such a configuration is desired if a medium frame 194 (shown in FIG. 3) having a shorter height than frame 190 is used. Similar to frame 190, frame 194 is vertically elevated above the platform 132.

As shown in FIG. 3, platform 130 is installed in the first compartment 110 with frame 194 over top, while the platform 130 is not installed in the second compartment 140, allowing frame 190 to be inserted into the second compartment.

Figure 5:
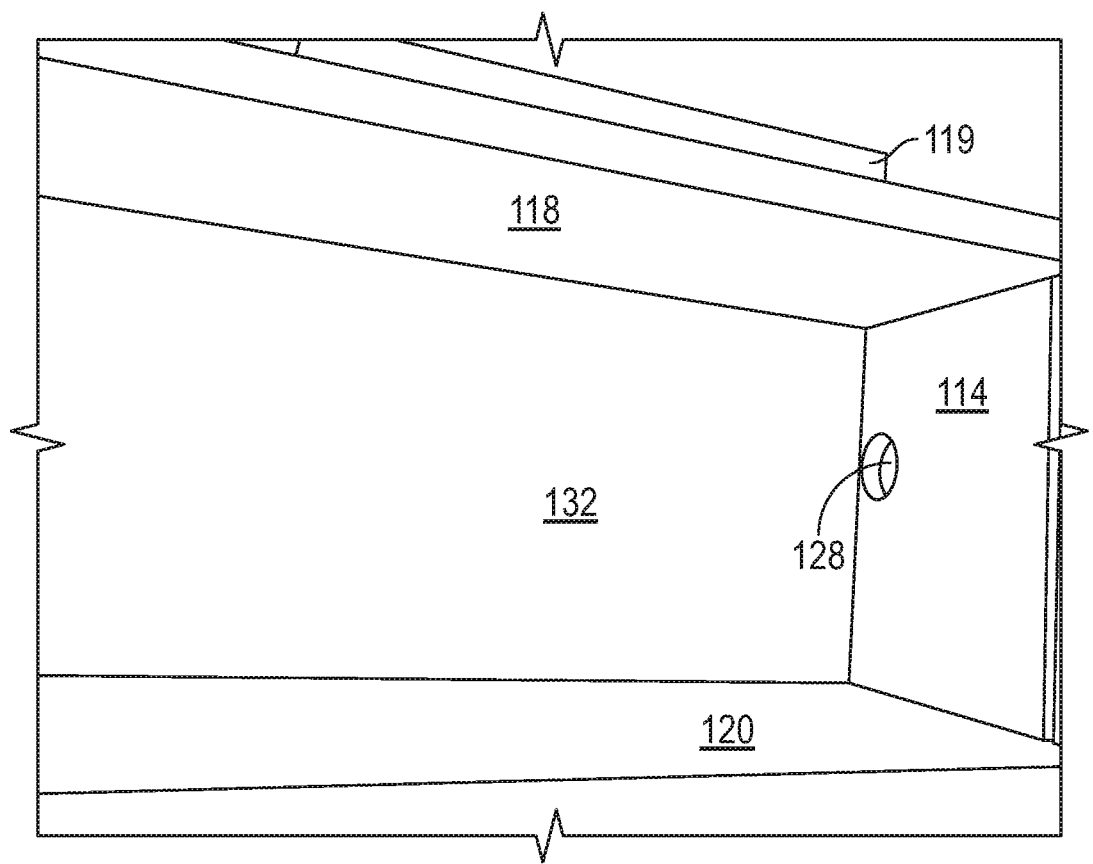
FIG. 5 is a perspective view of the interior of the first compartment of FIG. 3, with a removable ledge installed therein.

Referring to FIG. 3, the side opening 128 is in communication with at least one of the plurality of frames 190 and, as shown in FIG. 5, the side opening 128 is located at a height along the side wall 114 such that, when the platform 132 is placed on the ledge 130, the side opening 128 remains in communication with the at least one of the plurality of frames 194.

Figure 6:
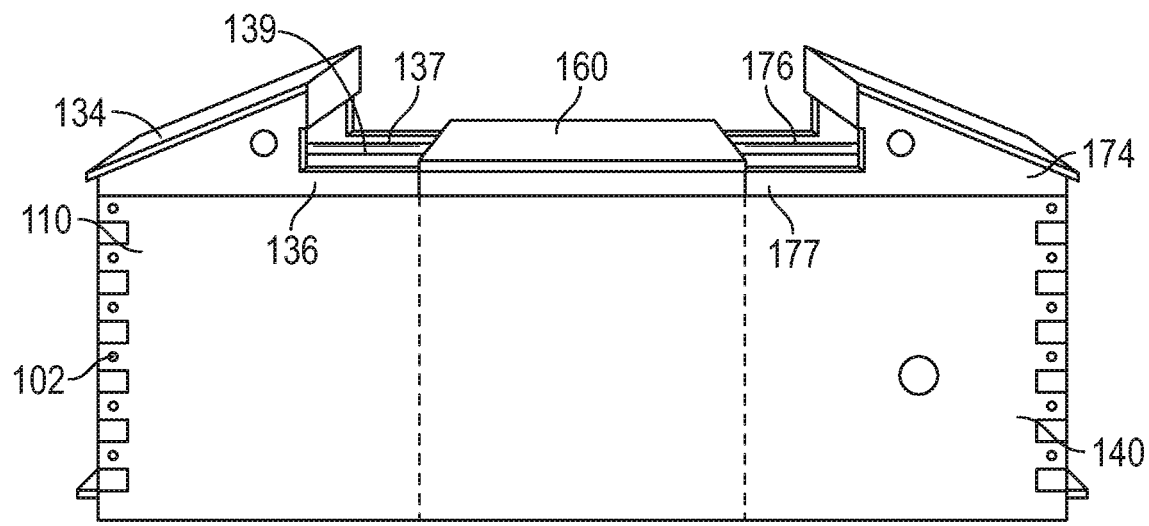
FIG. 6 is a front elevational view of the beehive of FIG. 1.

Referring to FIGS. 1A, 4, and 6, a first roof 134 extends over a portion of the first compartment 110, such that a remaining portion of the first compartment 110 proximate to the divider 160 is open. Similarly, a second roof 174, generally identical to the first roof 134, extends over a portion of the second compartment 140 such that a remaining portion of the second compartment 140 proximate to the divider 160 is open. When the first roof 134 is removed the first compartment 110, at least one of the frames 190 or 194 is removable from the first compartment 110.

Figure 7:
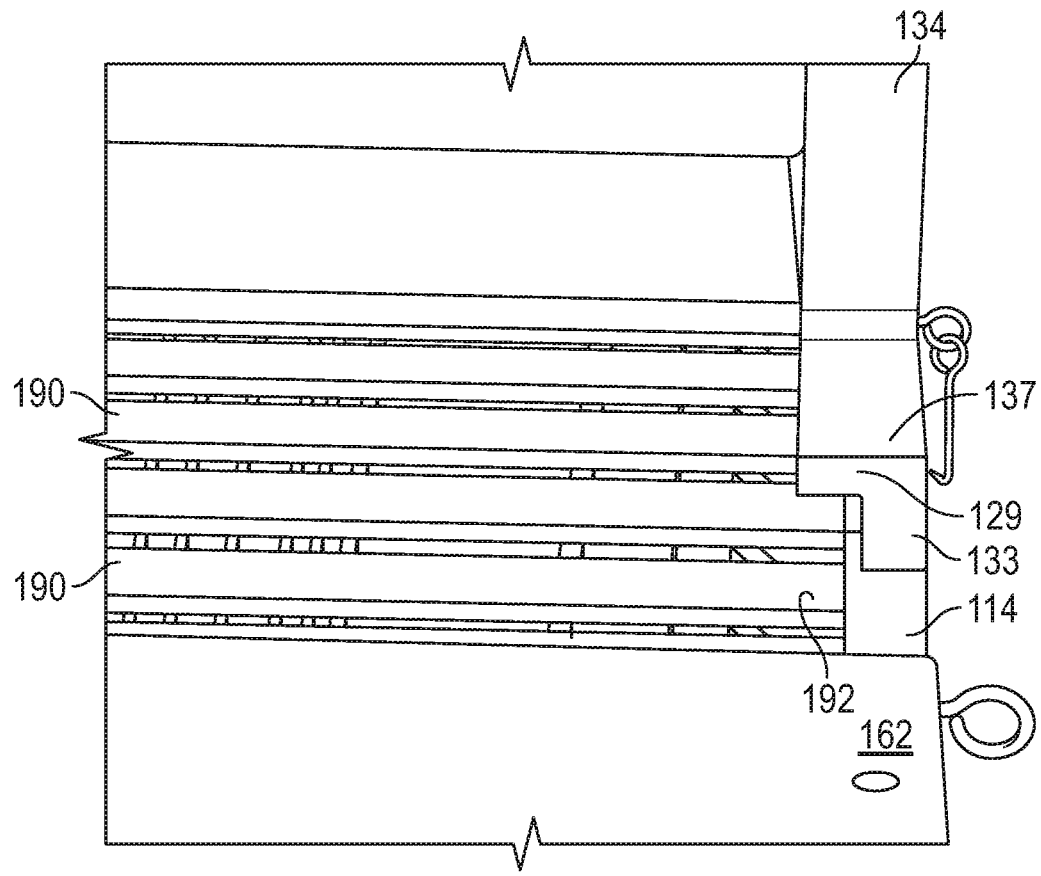
FIG. 7 is an enlarged perspective view of a side arm of a roof of the beehive slid partially away from the divider.
Figure 7A:
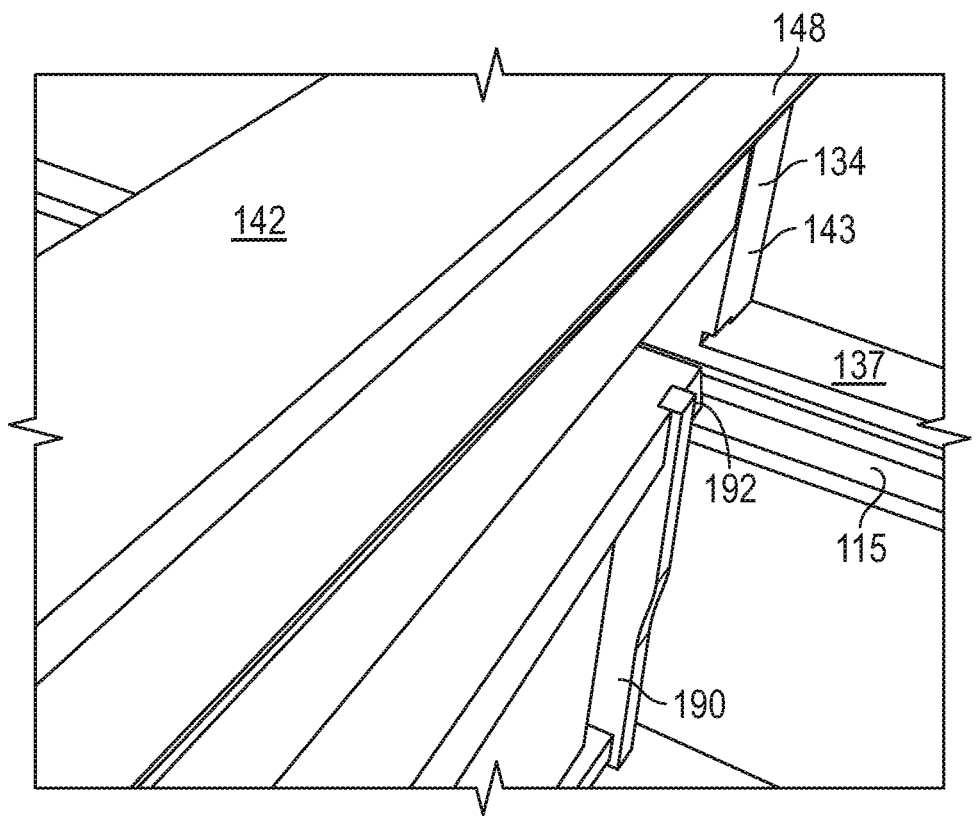
FIG. 7A is an enlarged perspective view of the roof of FIG. 7 over a frame.
Figure 8:
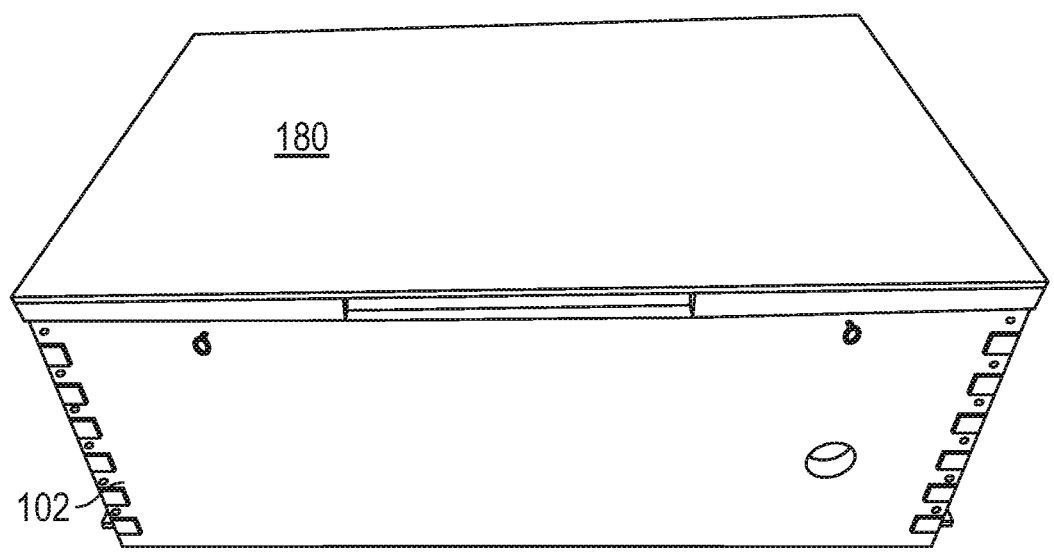
FIG. 8 is a perspective view of the beehive of FIG. 1, with a transport cover installed over the beehive.

The first roof 134 includes a first pair of spaced apart arms 136, 137 that extend from an end portion 138 toward the second roof 174 that extends over the second compartment 140. Additionally, the second roof 174 comprises a second pair of spaced apart arms that extend toward the first roof 136. The arms 136, 137 and the end portion 138 form a generally U-shape of the roof 134. Referring to FIGS. 7 and 7A, each arm 136, 137 includes a rib 129 that is adapted to extend over the tang 192 of the frames 190 that are installed in the first compartment 110. The rib 129 has a generally L-shaped cross-section such that a first leg 133 rests on the top of the side walls 114, 116. The L-shaped profile reduces or prevents the bees in the hive from propylizing along the seam between the first roof 134 and the side walls 114, 116 of the first compartment 110, potentially sealing the first roof 134 to the side walls 114, 116 of the first compartment 110. Optionally, the roofs 134, 174 can be constructed from Formica® or other suitable polymeric material that discourages propylization.

Referring to FIG. 6, the end portion 138 of the first roof 134 has a pitched top 142 resting on a pair of sloped side walls 143. In an exemplary embodiment, the pitch can be about 22.5 degrees. A seal 148 engages the super 198 when the super 198 is placed on top of the beehive 100 in order to reduce or eliminate rain that can enter the hive 100 between the super 198 and the roof 134.

Optionally, first roof 134 can include a securing mechanism, such as an eye hook 150 that can releasably engage an eye 152 extending outwardly from the exterior of the side wall 116 so that the first roof 134 does not blow off the beehive 100. Additionally, a through-opening 154 can be formed in the side wall 143 of the end portion 138 of the first roof 134. The through-opening 154 can be about ⅞" in diameter and obstructed with a mesh screen to provide for ventilation, while preventing ingress or egress to/from the beehive 100.

The first roof 134 removably extends over and is removably retained on the base 102 over the first compartment 110, such that the U-shape of the roof 134 provides a first opening 139 in the first compartment 110. When a super 198 (shown in FIG. 1A) is placed over beehive 100, the super 198 extends between the first roof 134 and the second roof 174.

The divider 160 has a length of about 10 inches between the first compartment 110 and the second compartment 140, and a width of about 20 inches. The divider 160 includes a divider cover 162 on top of the divider 160, and is sized to support the weight of at least one and, in some embodiments, a plurality of stacked supers 198 placed on top of the divider 160.

The queen excluder 188 is placed on the cover 162 of the divider 160 such that the queen excluder 180 extends between the first roof 134 and the second roof 174. The queen excluder 180 generally has the same footprint as the super 198. The queen excluder 180 includes a mesh with mesh openings that are large enough for worker bees to pass through, but too small for the queen to pass through, so that the queen remains in the first compartment 110 and cannot migrate upward into the super 198.

Referring to FIG. 4A, the divider cover 162 is sufficiently thick such that, when the queen excluder 180 is placed over the cover 162, a top bee space is formed between the bottom of the queen excluder 180 and the top of the frames 190. The divider 160 can be a dividing compartment that is generally hollow, but a side wall 164 of the divider 160 can include a drawer, a door, or a removable panel 166 for storing auxiliary items therein. For example, although not shown, a heater and its associated controllers and power source can be located within the divider 160 and operated to keep the beehive 100 warm in the winter. Also, a scale for weighing the supers 198 to monitor honey production can also be stored within the divider 160. Alternatively, tools for working with beehive 100 can also be stored within divider 160.

With the super 198 placed over the queen excluder 180 (as shown in FIG. 1A), the first roof 134 can be slid from the top of the base portion 102 to expose a plurality of frames 190, 194 located toward end wall 118. When the roof 134 is removed, at least one of the frames 110 is removable from the first compartment 110 by lifting the frame 190 vertically from the first compartment 110. After at least one of the frames 190 is removed from the first compartment 110, the remaining frames 190 are movable away from the divider 160 and are removable from the first compartment 110 in the same manner. The removed frames 190 are inserted into super 198 for worker bees to continue attending to the eggs, while fresh frames 190 are inserted into the first compartment 110, providing new honeycombs in the fresh frames 190 into which the queen can lay her eggs.

With the first and second roofs 134, 174 over their respective compartments 110, 140 a distance encompassing the remaining portion of the first compartment 110 defined as the first opening 139, the divider 160, and the remaining portion of the second compartment 140 defined as a second opening 149 is sized and adapted to removably receive and retain a super 198 mounted thereon. The super 198 extends over the arms 136, 137 of the first roof 134, as well as arms 176, 177 of the second roof 174, such that the first and second roofs 134, 174 are each slidable along their respective compartments 110, 140 until the arms 136, 137 and the arms 176, 177 clear the super 198 so that the roofs 134, 174 can be lifted and removed from the base portion 102.

If the beekeeper decides to move the beehive 100, the beekeeper removes the super 190 from the top of beehive 100, as well as the queen excluder 188, and the roofs 134, 174. The beekeeper then places a full cover 180, shown in FIG. 8, that is sized to extend over the first compartment 110, the divider 160, and the second compartment 140, over the beehive 100 so that the beehive 100 is in a condition to be moved.

Figure 9:
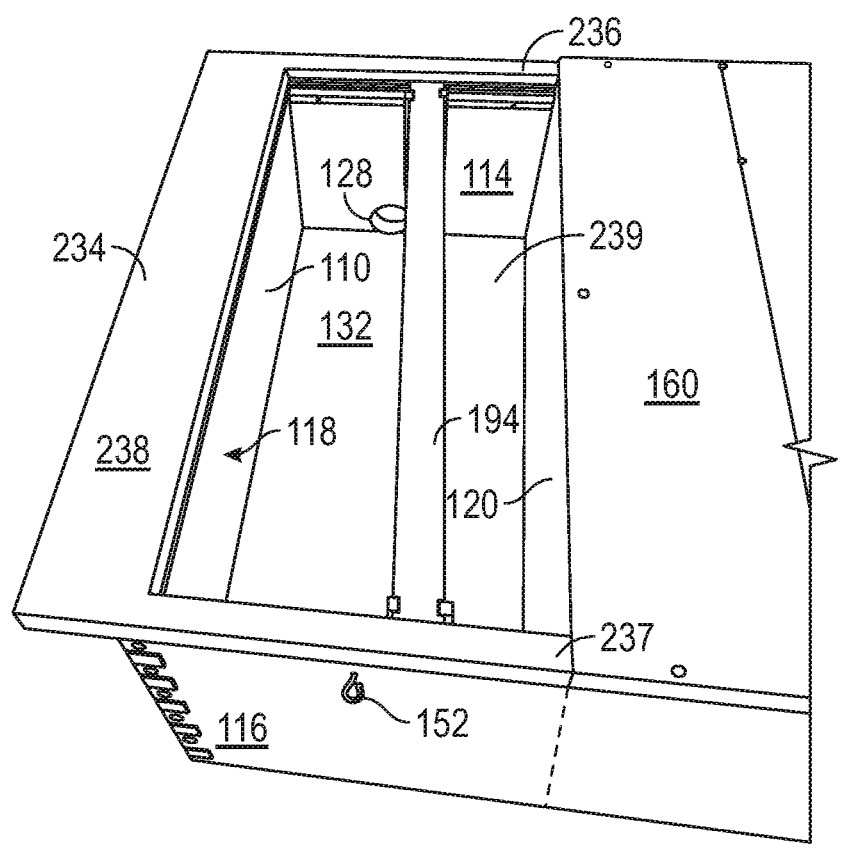
FIG. 9 is a perspective view of the first compartment of FIG. 3 with a winterizing adapter.

Optionally, depending on the climate and temperature zone in which the beehive 100 is being used, to over-winter the beehive 100, the roof 134, the supers 198 and the queen excluder 188 are removed from the beehive 100. A winterizing adapter 234 is shown on the first compartment 110 for visualization purposes only so that the entire interior of the first compartment 110 is visible. Winterizing adapter 234 will be described in more detail below with reference to FIG. 9 as well as to FIG. 3. The winterizing adapter 234, shown in FIGS. 3 and 9, is placed over the first compartment 110 as shown. Similar to roof 134, winterizing adapter 234 includes a first pair of spaced apart arms 236, 237 that extend from an end portion 238.

A relatively large first opening 239, defined by arms 236, 237, end portion 238, and divider 160,136 is open to the first compartment 110. The height of the winterizing adapter 234 is the same height as the height of the divider cover 162 so that a planar top area comprising the winterizing adapter 234 and the divider cover 162 is formed to support a super 198 placed thereon.

Figure 9A:
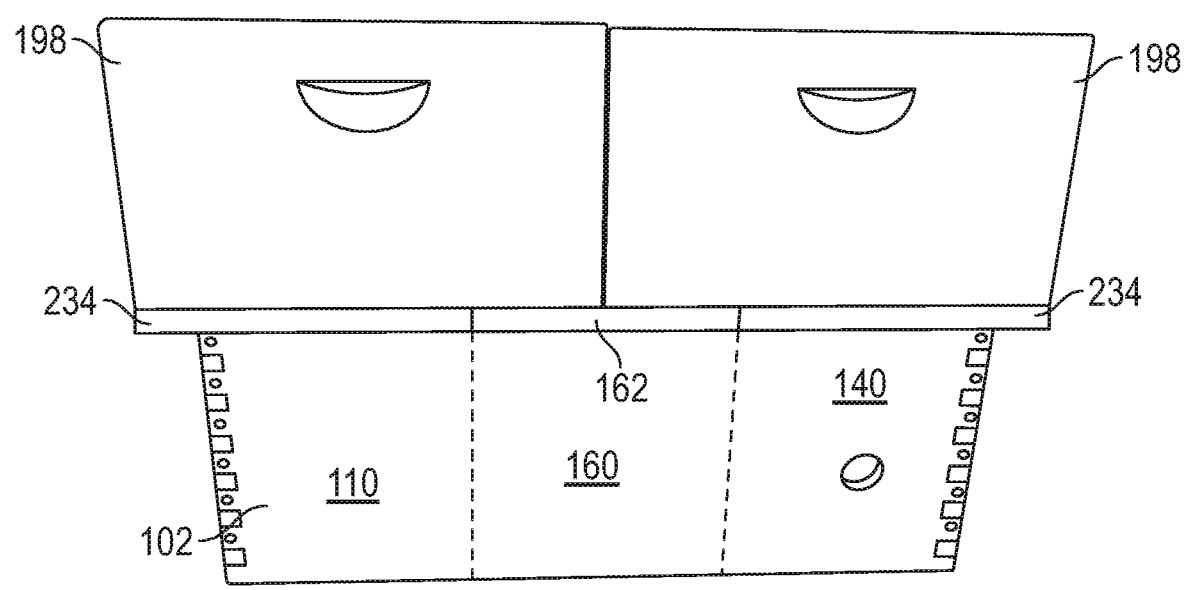
FIG. 9A is a front elevational view of the beehive of FIG. 1, with winterizing adapters and two supers mounted thereon.

Referring to FIG. 9A, a super 198 is placed over the winterizing adapter 234 and the first compartment 110, with a portion of the super 198 extending over about half of the divider 160. Similarly, another super 198 is placed over the second compartment 140 and the remaining half of the divider 160.

The beehive 100 can be constructed from wood, a polymer, or other suitable material for exterior year round exposure to the elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A two queen beehive comprising:
   a base having:
      a first compartment configured to retain a first queen;
      a second compartment configured to retain a second queen; and
      a divider dividing the first compartment from the second compartment;
   a first roof extending over a first top portion of the first compartment, such that a remaining top portion of the first compartment proximate to the divider is open; and
   a second roof extending over a first top portion of the second compartment, such that a remaining top portion of the second compartment proximate to the divider is open; and
   a queen excluder removably located horizontally over the remaining top portion of the first compartment, the remaining top portion of the second compartment, and the divider,
   wherein a distance encompassing the remaining portion of the first compartment, the divider, and the remaining portion of the second compartment is sized to receive and retain a super mounted thereon.

2. The two queen beehive according to claim 1, wherein the first roof is removably retained on the base.

3. The two queen beehive according to claim 2, wherein the first roof is slidable away from the divider.

4. The two queen beehive according to claim 3, wherein each compartment receives a plurality of removable frames.

5. The two queen beehive according to claim 4, wherein, when the first roof is slid away from the divider, one of the frames is removable from its respective compartment.

6. The two queen beehive according to claim 5, wherein, after the one of the frames is removed from its respective compartment, at least some of the remaining frames are movable away from the divider and removable from their respective compartment.

7. The two queen beehive according to claim 5, wherein each of the plurality of frames comprises a first tang adapted to engage the first compartment, and wherein the first roof comprises a rib adapted to extend over the tang.

8. The two queen beehive according to claim 5, wherein the first compartment comprises a side opening, wherein the side opening is in communication with at least one of the plurality of frames.

9. The two queen beehive according to claim 8, wherein the first compartment comprises a ledge extending at least partially around an inner perimeter of the first compartment, the ledge adapted to removably receive a platform, wherein, when the platform is on the ledge, the side opening remains in communication with the at least one of the plurality of frames.

10. The two queen beehive according to claim 1, wherein the first compartment is identical to the second compartment.

11. A two queen beehive comprising:
    a base having:
       a first end portion configured to retain a first queen and sized to retain a first plurality of frames inserted therein;
       a second end portion configured to retain a second queen and sized to retain a second plurality of frames inserted therein; and
       a divider extending between the first end portion and the second end portion;
    a queen excluder horizontally located above the divider, the queen excluder covering part of the first end portion and part of the second end portion;
    a first roof removably extending over the remainder of the first portion; and
    a second roof removably extending over the remainder of the second portion,
    wherein an area is provided between the first roof and the second roof such that a super is adapted to fit within the area such that, when the super is fit within the area, the super is located over the queen excluder and bees in the first end portion and the second end portion are able to directly vertically access the super through the queen excluder.

12. The two queen beehive according to claim 11, wherein the first roof further comprises a first pair of spaced apart arms extending toward the second roof, and wherein the second roof comprises a second pair of spaced apart arms extending toward the first roof.

13. The two queen beehive according to claim 11, further comprising a frame removably installed in the first compartment.

14. The two queen beehive according to claim 13, wherein the first end portion further comprises a platform removably inserted therein.

15. The two queen beehive according to claim 14, wherein the frame extends from below the roof to above the platform.

16. The two queen beehive according to claim 11, wherein the first roof is horizontally slidably removable from the first compartment.

17. The two queen beehive according to claim 16, wherein, when the first roof is removed, a frame installed in the first portion is removable from the first compartment.

18. The two queen beehive according to claim 11, further comprising a full cover sized to extend over the first end portion, the divider, and the second end portion.

19. A two queen beehive comprising:
 a base portion comprising:
  a first compartment configured to retain a first queen and a first plurality of frames;
  a second compartment configured to retain a second B queen and a second plurality of frames; and
  a dividing compartment located between the first compartment and the second compartment;
 a first roof removably inserted over a portion of the first queen compartment, the first roof having a first pair of arms extending outwardly therefrom, the first roof providing a first top opening in the first compartment between each of the first pair of arms; and
 a second roof removably inserted over a portion of the second queen compartment, the second roof having a second pair of arms extending outwardly therefrom, the second roof providing a second top opening in the second compartment between each of the second pair of arms, and
 a queen excluder removably inserted over the remainder of the first and second queen compartments;
 wherein the first opening, the dividing compartment, and the second opening are sized such that a super is removably insertable over the first top opening and the first pair of arms and over the second top opening and the second pair of arms, and
 wherein the first and second pairs of arms each have an L-shaped cross section such that, when the frames are installed in the first and second compartments, the arms are configured to extend over ends of the frames.

\* \* \* \* \*